Patented Dec. 21, 1937

2,102,726

UNITED STATES PATENT OFFICE 2,102,726

PRODUCTION OF ALCOHOLS

Martin Luther, Mannheim, and Wilhelm Dietrich, Ludwigshafen-on-the-Rhine, Germany, assignors to I. G. Farbenindustrie Aktiengesellschaft, Frankfort-on-the-Main, Germany No Drawing. Application June 23, 1936, Serial No. 86,816. In Germany October 15, 1929

6 Claims. (Cl. 260—156)

This application is a continuation in part of our copending application Ser. No. 486,280 filed October 3rd, 1930 now Patent No. 2,048,662, dated July 21, 1936.

The present invention relates to the production of alcohols. By the destructive oxidation of liquid or solid hydrocarbons, a mixture of different oxygen-containing products, such as acids, lactones, esters, aldehydes, ketones and the like which usually also contain unattacked initial material is generally obtained as the oxidation product. When obtained under the said liquid-phase conditions, the oxygenated products of the liquid-phase oxidation will contain about the same number of carbon atoms as the initial materials, of which paraffin is known to contain hydrocarbons containing from about 12 to 36 carbon atoms, mainly from about 12 to about 24 carbon atoms (compare for example Berichte der Deutschen Chemischen Gesellschaft, vol. 40 (1907), page 4779. In accordance with the said statements water-insoluble fatty acids containing from 10 to about 35 carbon atoms, mainly from 11 to 24 carbon atoms, have been identified in the liquid phase oxidation products from paraffin (according to the aforesaid citations, Chemiker Zeitung 49 (1920), page 311, and Zeitschrift für angewandte Chemie 1918, page 69). Similarly, alcohols in the said oxidation products contain from about 10 to 25 carbon atoms (see Journal of the Chemical Society 1926, page 2377), lauryl, myristyl, palmityl and stearyl or octodecyl alcohols together with alcohols containing 22, 24, and 25 carbon atoms having been found besides the corresponding myristic, palmitic, isopalmitic, stearic and arachic acids, the alcohols having from about 12 to about 20 carbon atoms constituting generally the predominant portion of the whole mixture of alcohols.

We have now found that a product consisting mainly of the higher members of the aliphatic alcohol series is readily obtained from the mixture produced in the manner already known by the destructive oxidation of difficultly volatile, i. e. liquid or solid hydrocarbons in the liquid state as for example with gaseous oxidizing agents containing free oxygen such as air or mixtures of oxygen with carbon dioxide or nitrogen, with or without the employment of catalysts, by subjecting the said mixture obtained by oxidation, or constituents containing oxygen separated therefrom, as for example the neutral fraction consisting of esters, ketones and the like, to a hydrogenation at superatmospheric pressure with large quantities of hydrogen, or gaseous mixtures containing hydrogen, for example a gaseous mixture containing besides hydrogen a low amount of carbon monoxide. The hydrogenation is carried out with hydrogen at elevated pressures usually ranging up to about 100 atmospheres, in the presence of copper or copper containing catalysts and at elevated temperatures ranging from about 150° to 220° C., but somewhat higher or lower temperatures, such as up to about 250 and down to about 100° C. may also be employed. As catalysts come into question for example copper in a finely divided state or copper containing catalysts, for example those which are obtainable by adding sodium bicarbonate to an aqueous solution of copper, zinc and manganese nitrates, and drying the precipitate obtained. Furthermore copper catalysts may be employed which have been activated by the addition of metal oxides, such as aluminium oxide or chromium oxide. It is of particular advantage to employ the said copper catalysts deposited on carriers, such as kieselguhr, bleaching earth or pumice. The pressure employed in the present process should generally exceed 10 atmospheres, since otherwise the reaction would proceed too slowly for practical purposes and pressures above 300 atmospheres are generally not employed, since this method of working would require particularly costly apparatus. The absorption of hydrogen is completed in a short period of time. The duration of the reaction depends on the kind of the initial material and on the working conditions employed. For example with oxidation products from paraffin wax a hydrogenation effected at 200° C. and at a pressure of 50 atmospheres in the presence of finely divided metallic copper or a copper containing catalyst, such as a mixture of copper, manganese and zinc carbonate as a catalyst is already completed in three hours. The separation of the alcohols formed from the unattacked initial material and any acids present may be effected in any usual and convenient manner by physical or chemical methods, as for example by the employment of solvents having a selective dissolving power, by distillation or by esterification.

Though the initial oxidation products are of a most heterogeneous composition the reduction stops contrary to all expectation at the alcohol stage and practically no hydrocarbons are formed.

Alcohols having a more or less high melting point are obtained according to the nature of the initial materials employed for the oxidation, such as petroleum fractions boiling above 180° C., as for example middle oils, liquid, hard or soft paraffins and the like. For example, by employing hard paraffin wax as the initial material in the oxidation, a product is obtained the melting point of which is above 30° C. In most cases mixtures of alcohols having a very high molecular weight are obtained, the alcohols from oxidation products of the said petroleum fractions containing an average of about 10 carbon atoms and those from paraffin waxes an average of about 15 carbon atoms. Depending on the content of the initial materials for the hydrogenation of unoxidized hydrocarbon the hydroxyl value of the final products will vary between 100 and 200.

The following examples will further illustrate the nature of this invention, but the invention is not restricted to these examples. The parts are by weight.

*Example 1*

The oxidation product obtained by treating paraffin wax at 160° C. with air having a saponification number of 150 is saponified and after removing the soaps the unsaponifiable constituents are extracted with 96 per cent methanol. The product thus obtained has a hydroxyl value of 86. 100 parts of this product are mixed with 2.5 parts of a catalyst consisting of a mixture of each of 1 molecular proportion of copper carbonate and manganese carbonate and half a molecular proportion of zinc carbonate and then treated with hydrogen at 180° C. under a pressure of 50 atmospheres for about from 2 to 4 hours in a stirring autoclave. The hydrogenation product obtained is freed from the catalyst by filtration; it possesses a hydroxyl value of 207.

In the present process it is unnecessary to reduce the above mentioned catalyst before its use, since the carbonates are reduced during the hydrogenation.

*Example 2*

To 200 parts of the unsaponifiable oxidation product as employed in Example 1 are added 2.75 parts of the catalyst described below. The mixture is then treated with hydrogen containing 1 per cent of carbon monoxide at 100 atmospheres and 200° C. in a stirring autoclave for about two hours. In this manner a hydrogenation product is obtained which possesses a hydroxyl number of 210.

The hydrogenating catalyst employed is obtained by dissolving 1 part of each of copper nitrate and manganese nitrate and half a part of zinc nitrate in water and precipitating said salts in form of their carbonates while adding simultaneously 2 and a half parts of kieselguhr and sodium bicarbonate in excess. The precipitate is filtered off, washed with water and dried.

*Example 3*

1000 parts of an oxidation product which has been prepared by blowing paraffin oil in the presence of 1 per cent of its weight of manganese naphthenate at 160° C. with air and which contains about 35 per cent its weight of free carboxylic acids, are subjected in an autoclave and in the presence of 10 parts of copper deposited on 30 parts of kieselguhr to the action of hydrogen at a temperature of 230° C. for about four hours while stirring, after hydrogen has been pressed into the autoclave until a pressure of 200 atmospheres has been attained. After filtering off the catalyst the last traces of copper are washed out from the product by means of dilute aqueous sulfuric acid. After separating the saponifiable constituents of the products by a treatment with aqueous caustic soda at about 100° C. and drawing off the aqueous soap solution, about 30 per cent of the original oxidation product is obtained as a mixture of high-molecular liquid alcohols which has a hydroxyl value of 160.

What we claim is:

1. The process for the production of products consisting mainly of mixtures of the higher members of the aliphatic alcohol series which comprises heating the products, comprising non-aromatic long-chain acids, esters and carbonyl compounds from a destructive oxidation of difficultly volatile hydrocarbons in the liquid phase by means of a gaseous oxidizing agent containing free oxygen, in the presence of hydrogen and of a copper catalyst at a pressure about 10 atmospheres.

2. The process for the production of products consisting mainly of mixtures of the higher members of the aliphatic alcohol series which comprises heating the products, comprising non-aromatic long-chain acids, esters and carbonyl compounds from a destructive oxidation of difficultly volatile hydrocarbons in the liquid phase by means of a gaseous oxidizing agent containing free oxygen, in the presence of hydrogen and of a copper catalyst at a pressure above 10 atmospheres to a temperature between about 100° and 250° C.

3. The process for the production of products consisting mainly of mixtures of the higher members of the aliphatic alcohol series which comprises heating the products, comprising non-aromatic long-chain acids, esters and carbonyl compounds from a destructive oxidation of difficultly volatile paraffin hydrocarbons in the liquid phase by means of air, in the presence of hydrogen and of a copper catalyst at a pressure above 10 atmospheres to a temperature between about 150° and 230° C.

4. The process for the production of products consisting mainly of mixtures of the higher members of the aliphatic alcohol series which comprises heating the products, comprising non-aromatic long-chain acids, esters and carbonyl compounds from a destructive oxidation of difficultly volatile paraffin hydrocarbons in the liquid phase by means of air, in the presence of hydrogen and of copper at a pressure above 10 atmospheres to a temperature between about 150° and 230° C.

5. The process for the production of products consisting mainly of mixtures of the higher members of the aliphatic alcohol series which comprises heating the products, comprising non-aromatic long-chain acids, esters and carbonyl compounds from a destructive oxidation of paraffin wax in the liquid phase by means of air, in the presence of hydrogen and of copper at a pressure between about 20 and 200 atmospheres.

6. The process for the production of products consisting mainly of mixtures of the higher members of the aliphatic alcohol series which comprises heating a fraction of reducible neutral compounds of a product, comprising long-chain esters, and carbonyl compounds from destructive oxidation of paraffin wax in the liquid phase by means of air, in the presence of hydrogen and of a catalyst essentially comprising copper at a pressure between about 20 and 200 atmospheres.

MARTIN LUTHER.
WILHELM DIETRICH.